US011468067B2

(12) United States Patent
Harris et al.

(10) Patent No.: US 11,468,067 B2
(45) Date of Patent: Oct. 11, 2022

(54) INFORMATION STORAGE SYSTEM FOR USER INQUIRY-DIRECTED RECOMMENDATIONS

(71) Applicant: PATRA CORPORATION, El Dorado Hills, CA (US)

(72) Inventors: Branton Taylor Harris, Springfield, MO (US); Christopher Joseph Dieckmann, Sonoma, CA (US); John Sedwick Simpson, El Dorado Hills, CA (US); Sean Clayton Kennedy, Minden, NV (US); Jonathan Douglas Baker, Springfield, MO (US); Earl Stinson VanBuskirk, Jr., Antioch, CA (US)

(73) Assignee: PATRA CORPORATION, El Dorado Hills, CA (US)

( * ) Notice: Subject to any disclaimer, the term of this patent is extended or adjusted under 35 U.S.C. 154(b) by 287 days.

(21) Appl. No.: 16/741,468

(22) Filed: Jan. 13, 2020

(65) Prior Publication Data
US 2020/0226138 A1 Jul. 16, 2020

Related U.S. Application Data

(60) Provisional application No. 62/791,987, filed on Jan. 14, 2019.

(51) Int. Cl.
*G06F 16/2457* (2019.01)
*G06F 16/2455* (2019.01)
*G06F 16/248* (2019.01)
*G06F 16/22* (2019.01)
*G06F 16/28* (2019.01)

(52) U.S. Cl.
CPC .... *G06F 16/24564* (2019.01); *G06F 16/2246* (2019.01); *G06F 16/248* (2019.01); *G06F 16/2457* (2019.01); *G06F 16/284* (2019.01)

(58) Field of Classification Search
None
See application file for complete search history.

(56) References Cited

U.S. PATENT DOCUMENTS 5,471,382 A * 11/1995 Tallman ................. G16H 40/20
600/300
10,628,553 B1 * 4/2020 Murrish ............... G06F 16/2365
(Continued)

*Primary Examiner* — Wilson Lee
(74) *Attorney, Agent, or Firm* — Haynes and Boone, LLP

(57) ABSTRACT

A recommender system includes an information storage and a recommender. The recommender configures the information storage according to a recommender data structure. The data structure includes multiple nodes, each including an inquiry hook and an option hook connected to each other. The inquiry hook includes an inquiry text corresponding to a user inquiry. In the data structure, a first node is associated with one or more child nodes, wherein the user inquiry text of the first node has one or more option values, each option value is included respectively in the option hook of the child nodes. The inquiry hook of at least one of the multiple nodes includes an end point hook, which corresponds to one or more of the following recommendation actions: recommending a carrier, manual submission, and declining coverage. The recommender system may traverse the recommender data structure to retrieve recommendation action(s) to the user.

18 Claims, 10 Drawing Sheets

(56) References Cited

U.S. PATENT DOCUMENTS

| | | | | |
|---|---|---|---|---|
| 10,770,181 B2* | 9/2020 | Bull | ................... | G06F 16/24578 |
| 2002/0194120 A1* | 12/2002 | Russell | ................... | G06Q 30/06 |
| | | | | 705/38 |
| 2008/0201172 A1* | 8/2008 | McNamar | ............... | G16H 10/40 |
| | | | | 705/3 |
| 2012/0069131 A1* | 3/2012 | Abelow | ............... | G06Q 10/067 |
| | | | | 348/14.01 |
| 2012/0174014 A1* | 7/2012 | Ash | ........................ | G16H 10/60 |
| | | | | 715/771 |
| 2013/0051544 A1* | 2/2013 | Ross | ................... | H04M 3/5232 |
| | | | | 379/265.02 |
| 2014/0201126 A1* | 7/2014 | Zadeh | .................... | A61B 5/165 |
| | | | | 706/52 |
| 2016/0364535 A1* | 12/2016 | Kusens | .............. | G06Q 30/0613 |
| 2017/0177809 A1* | 6/2017 | Bull | ........................ | G16H 10/20 |
| 2018/0181716 A1* | 6/2018 | Mander | .................. | G16H 40/20 |
| 2019/0026786 A1* | 1/2019 | Khoury | .............. | G06Q 30/0271 |

* cited by examiner

| Inquiry | Options | Carriers |
|---|---|---|
| Do you have Employees? | No | CNA,Hard Decline,BIS,Manual Submission, HISCOX,BIS, Submission,Manual Submission,BTIS, BIS, Manual Sub |
| ** Are you Based in or will you Operate in the State of NY? | Yes | Hard Decline |
| ** Are you Based in or will you Operate in the State of NY? | No | BIS,Manual Submission, HISCOX,BIS,Manual Submission,BTIS,BIS,Manual Submission,BIS,Manual S Submission,BTIS,BIS,Manual Submission,Manual Submission,BT |
| **** What are your Gross Annual Sales? | $150,000 or Less | HISCOX,BIS,Manual Submission,Manual Submission,BT |
| ***** What are your Annual Subcontractor Costs? | I Don't use Subcontractor | HISCOX |
| ***** What are your Annual Subcontractor Costs? | $200,000 or Less | Manual Submission,BTIS |
| ****** Are you Domiciled (Based) in any of the Following States: AK,DC,FL,MD,HI,NY,VT? | Yes | Manual Submission |
| ****** Are you Domiciled (Based) in any of the Following States: AK,DC,FL,MD,HI,NY,VT? | No | BTIS |
| ****** Are you Domiciled in one of these States: AZ,CA,CO,ID,IL,MI,MN,NV,OR,TX,UT,WA,WI,WY? | Over $200,000 | BIS,Manual Submission |
| ****** Are you Domiciled in one of these States: AZ,CA,CO,ID,IL,MI,MN,NV,OR,TX,UT,WA,WI,WY? | Yes | BIS |
| ****** Are you Domiciled in one of these States: AZ,CA,CO,ID,IL,MI,MN,NV,OR,TX,UT,WA,WI,WY? | No | Manual Submission |
| ***** What are your Gross Annual Sales? | $151,000-$1,500,000 | BIS,Manual Submission,BIS,Manual Submission,Manual |
| ****** Is your Gross Annual Payroll Less than $500,000? | Yes | BIS,Manual Submission,BTIS |
| ******* Are you Domiciled (Based) in any of the Following States: AK,DC,FL,MD,HI,NY,VT? | Yes | Manual Submission |
| ******* Are you Domiciled (Based) in any of the Following States: AK,DC,FL,MD,HI,NY,VT? | No | BTIS |
| ****** Is your Gross Annual Payroll Less than $500,000? | No | BIS,Manual Submission |
| ******* Are you Domiciled in one of these States: AZ,CA,CO,ID,IL,MI,MN,NV,OR,TX,UT,WA,WI,WY? | Yes | BIS |
| ******* Are you Domiciled in one of these States: AZ,CA,CO,ID,IL,MI,MN,NV,OR,TX,UT,WA,WI,WY? | No | Manual Submission |
| ***** What are your Gross Annual Sales? | Over $1,500,000 | BIS,Manual Submission |
| ****** Are you Domiciled in one of these States: AZ,CA,CO,ID,IL,MI,MN,NV,OR,TX,UT,WA,WI,WY? | Yes | BIS |
| ****** Are you Domiciled in one of these States: AZ,CA,CO,ID,IL,MI,MN,NV,OR,TX,UT,WA,WI,WY? | No | Manual Submission |

FIG. 2A

| Inquiry | Options | Carriers |
|---|---|---|
| Do you have Employees? | No | CNA,Hard Decline,BIS,Manual Submission, HISCOX,BIS Submission,Manual Submission,BTIS,BIS,Manual Sub |
| Are you Based in or will you Operate in the State of NY? | Yes | Hard Decline |
| Are you Based in or will you Operate in the State of NY? | No | BIS,Manual Submission,HISCOX,BIS,Manual Submission Submission,BTIS,BIS,Manual Submission,BIS,Manual S |
| **** What are your Gross Annual Sales? | $150,000 or Less | HISCOX,BIS,Manual Submission,Manual Submission,BT |
| ***** What are your Annual Subcontractor Costs? | I Don't use Subcontractor | HISCOX |
| ***** What are your Annual Subcontractor Costs? | $200,000 or Less | Manual Submission,BTIS |
| ****** Are you Domiciled (Based) in any of the Following States: AK,DC,FL,MD,HI,NY,VT? | Yes | Manual Submission |
| ******* Are you Domiciled (Based) in any of the Following States: AK,DC,FL,MD,HI,NY,VT? | No | BTIS |
| ****** What are your Annual Subcontractor Costs? | Over $200,000 | BIS,Manual Submission |
| ******** Are you Domiciled in one of these States: AZ,CA,CO,ID,IL,MI,MN,NV,OR,TX,UT,WA,WI,WY? | Yes | BIS |
| ******** Are you Domiciled in one of these States: AZ,CA,CO,ID,IL,MI,MN,NV,OR,TX,UT,WA,WI,WY? | No | Manual Submission |
| **** What are your Gross Annual Sales? | $151,000-$1,500,000 | BIS,Manual Submission,BIS,Manual Submission,Manual |
| ***** Is your Gross Annual Payroll Less than $500,000? | Yes | Manual Submission,BTIS |
| ****** Are your Annual Subcontractor costs $200,00 or Less? | Yes | Manual Submission |
| ******* Are you Domiciled (Based) in any of the Following States: AK,DC,FL,MD,HI,NY,VT? | Yes | Manual Submission |
| ******* Are you Domiciled (Based) in any of the Following States: AK,DC,FL,MD,HI,NY,VT? | No | BTIS |
| ****** Are your Annual Subcontractor Costs $200,000 or Less? | No | BIS,Manual Submission |
| ******** Are you Domiciled in one of these States: AZ,CA,CO,ID,IL,MI,MN,NV,OR,TX,UT,WA,WI,WY? | Yes | BIS |
| ******** Are you Domiciled in one of these States: AZ,CA,CO,ID,IL,MI,MN,NV,OR,TX,UT,WA,WI,WY? | No | Manual Submission |
| ***** Is your Gross Annual Payroll Less than $500,000? | No | BIS,Manual Submission |
| ****** Are you Domiciled in one of these States: AZ,CA,CO,ID,IL,MI,MN,NV,OR,TX,UT,WA,WI,WY? | Yes | BIS |
| ****** Are you Domiciled in one of these States: AZ,CA,CO,ID,IL,MI,MN,NV,OR,TX,UT,WA,WI,WY? | No | Manual Submission |
| **** What are your Gross Annual Sales? | Over $1,500,000 | BIS,Manual Submission |
| ***** Are you Domiciled in one of these States: AZ,CA,CO,ID,IL,MI,MN,NV,OR,TX,UT,WA,WI,WY? | Yes | BIS |
| ***** Are you Domiciled in one of these States: AZ,CA,CO,ID,IL,MI,MN,NV,OR,TX,UT,WA,WI,WY? | No | Manual Submission |

FIG. 2B

INFORMATION STORAGE SYSTEM FOR USER INQUIRY-DIRECTED RECOMMENDATIONS

CROSS-REFERENCE TO RELATED APPLICATIONS

This application claims the benefit of and priority to U.S. Provisional Patent Application No. 62/791,987, filed Jan. 14, 2019, and entitled "INFORMATION STORAGE SYSTEM FOR USER INQUIRY-DIRECTED RECOMMENDATIONS," which is hereby incorporated by reference in its entirety for all purposes.

FIELD

The present disclosure relates generally to recommendation systems and examples of information storage database system and user inquiry-directed recommender method of querying the same are described.

BACKGROUND

Recommendation systems, such as insurance plan selection websites or the like, typically include user inquiry-directed recommendations, where a user provides input to the system in the form of answers to select questions displayed by the system. Using the user input to the answers, the system filters the plan options to a narrower set (e.g., four plan options), which are then displayed to the user to select from. These systems typically use a data structure built on a set of user inquiries, and the series of questions are predetermined and built into the data structure.

For example, an expert system builds a database based on a series of questions provided by an expert (e.g., a doctor). Each question in the database directs a user to provide an answer, which may lead to multiple output selections or another question, which may also lead to more additional questions. While these database structures can be effective, typically the database is constructed bottom up from the initial inquiry to the next series of inquiries to the final recommendations. Thus, the database structure does not easily allow a user to easily change or add new questions or otherwise be dynamically modifiable. Rather, to change the database for the recommender, a person with programming experience (e.g., a software developer) must restructure the entirety of the database to add in new questions or direct user answers to additional database paths. This limits the ability of the database to quickly adapt to new information or changes in the marketplace and therefore is not readily applicable to applications where inquiries or underlying recommendations may frequently change. For example, in a recommendation system for selecting insurance carriers, the underlying data structure needs to be frequently updated as the underwriting rules constantly change. Therefore, there is a need for a database structure and method for querying the database that allows non-programming users to dynamically modify the structure.

BRIEF DESCRIPTION OF THE DRAWINGS

FIGS. 2A and 2B are example inquiry lists for a recommendation system according to various aspects of the present disclosure.

DETAILED DESCRIPTION

Figure 1:
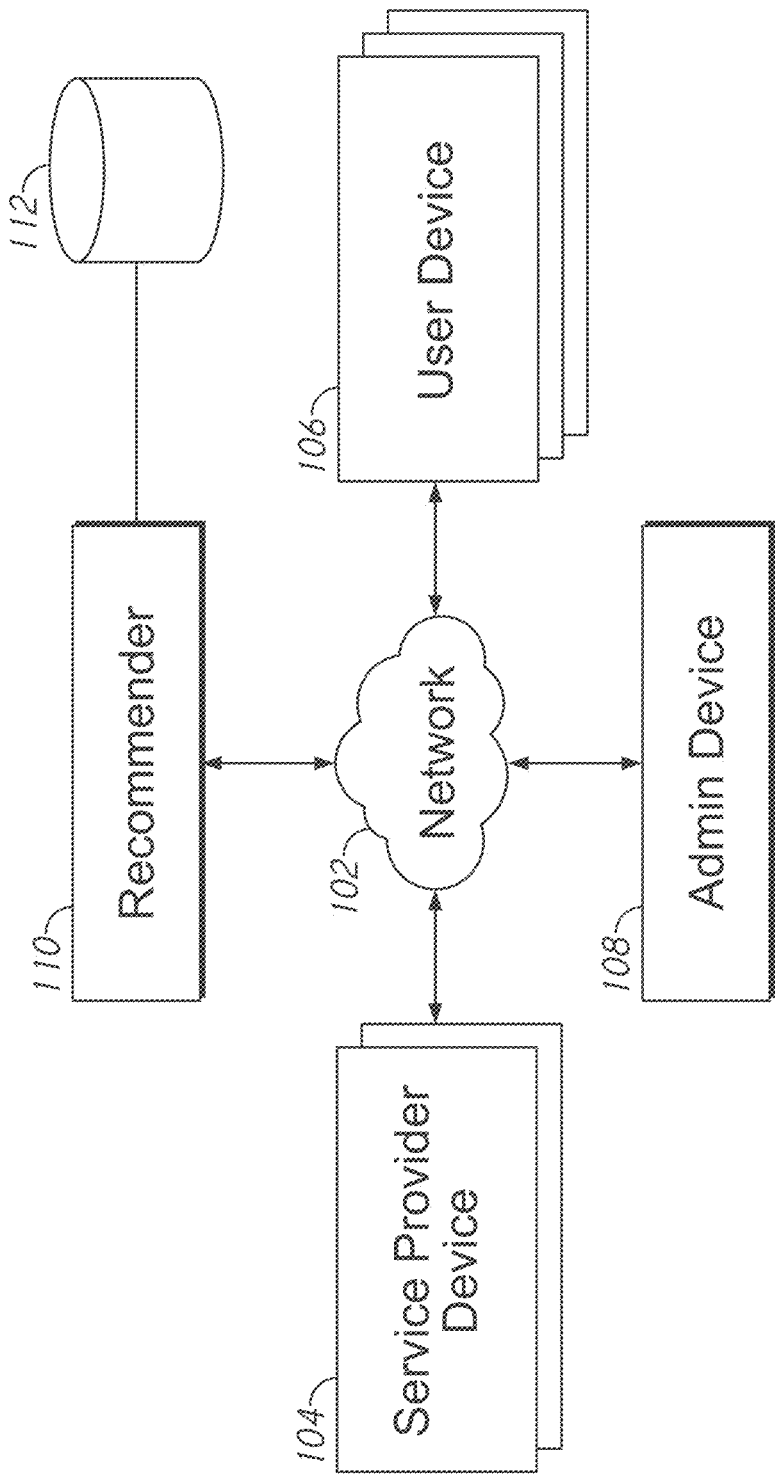
FIG. 1 is a block diagram of an example recommendation system according to various aspects of the present disclosure.

Various embodiments of the present disclosure will be explained below in detail with reference to the accompanying drawings. The following detailed description refers to the accompanying drawings that show, by way of illustration, specific aspects and embodiments in which the present invention may be practiced. Other embodiments may be utilized, and structure, logical and electrical changes may be made without departing from the scope of the present invention. The various embodiments disclosed herein are not necessary mutually exclusive, as some disclosed embodiments can be combined with one or more other disclosed embodiments to form new embodiments.

In some examples, an information storage database system may include a top-down structure to store various inquiries and associated options, and method of querying the database system in a user inquiry-directed fashion. For example, the database structure allows a customer to answer a series of questions and leads the customer to a single option depending on the answers provided by the customer. The database structure is configured to facilitate dynamic updating of the inquiries without a programmer's assistance, e.g., programming knowledge is not required to dynamically modify the database structure, including, deleting, and modifying the inquiries and pathways. This allows the system to be nimble and react quickly in the often-changing industry. For example, the top-down implementation of the database, meaning that the initially stored or coded items are the end results (e.g., a particular carrier and insurance policy) and then the pathways are built downwards from the end result. This means that to change a pathway, only select links at the bottom end of the database need to be replaced, rather than recreating an entire pathway.

In a non-limiting example, the information storage database system is implemented in a recommendation system including an information storage and a recommender. For example, a recommendation system may include multiple service provider devices where the provider devices send a respective service provider's rules to the recommender, which generates the recommender data structure based on the rules for the service providers. The recommender may also receive a request from a user device to provide a recommendation, e.g., an insurance carrier. In response to the request, the recommender may traverse the recommender data structure to retrieve one or more recommended carriers and transmit the recommendation to the user device. For example, the recommender may start from a start node and obtain an inquiry in the start node. The system may display the inquiry to the user and retrieve the answer from the user. Depending on the answer from the user, the recommender may determine the child node and retrieve the inquiry hook or other connection relationship to the child node. If the inquiry hook includes an inquiry text, the system may display the inquiry to the user and determine the next child node (e.g., next stepping stone or direction within the database) based on the user's answer to the inquiry. If the inquiry hook includes an end point hook, the system may display a recommendation action in the end point to the user. In some examples, the recommendation action may include the name(s) of the carrier(s), a decline, or a recommendation for other output (e.g., manual submission, output to user regarding no market place options, or the like). The hooks in the system may define a relationship between two nodes that connects them together. For example, a first node may direct to a second node via a hook and if the second node is replaced, the hook is updated to point to a third node rather than the second node. This allows a "patch" type of replacement for a particular path of the database, rather than a rewriting of the entire path as typically required with bottom up built databases.

Turning now to the figures, a system of the present disclosure will be discussed in more detail. FIG. 1 is a block diagram of an example recommendation system according to various aspects of the present disclosure. A recommendation system 100 may include multiple service provider devices, e.g., 104. The service provider device 104 may be configured to provide one or more rules that can be analyzed by the system to determine one or more recommendations for a user based on the user's unique requirements and/or characteristics. A rule may include a series of inquiries, where each inquiry may include various choices. For example, a service provider may be an insurance carrier or an underwriting company that provides insurance coverages. A rule may include an option and one or more associated choices depending on the option. In a non-limiting example, an option may be a binary value, such as "yes" and "no." For example, a rule may include an inquiry as to whether an insured is residing in New York. The rule may also include an option having a value "yes" or "no." The rule may also have one or more choices associated with each inquiry, whereas a choice may include a single recommendation result or one or more additional inquiries. For example, if an option (or customer's answer) to the above inquiry is "yes" (i.e., an insured is residing in New York), then the choice is "no coverage." In another example, the rule may include an inquiry as to whether an insured is residing in one of the states: AK, DC, FL, MD, HI, NY or VT. An associated choice to such inquiry, when the answer is "yes," is that a manual submission or no marketplace coverage output is presented to the user. This means that the system is not able to automatically recommend a carrier. Instead, the user needs to manually submit an application with the service provider or is otherwise provided an output that the online marketplace cannot provide applicable coverage.

In some examples, the recommendation system may receive the rules from the service providers. The recommendation system may automatically parse the rules and generate the information storage database system to store the rules in a database structure. In some examples, the recommendation system may also include a tool to allow a service provider or a system operator to manually or automatically input the rules. For example, the system may provide a user interface that displays a rule template including various rules to allow an operator to select a rule from the template. Alternatively, and/or additionally, the system may prompt a database administrator to manually enter a rule, such as by typing into a form on the template.

In some examples, the recommendation system 100 may further include a recommender 110 that receives the rules from the service provider devices 104, compiles one or more rules from multiple service providers to inquiry data, and converts the inquiry data to a recommender data structure. In some examples, a recommender may include a computing unit (software or hardware). For example, the recommender may include a processor and non-transitory computer-readable medium that contains programming instructions. When executed, the programming instructions may cause the processor to perform various operations and/or implement various algorithms. The recommender may further store the recommender data structure in a database 112 of the recommender system. The recommender 110 may be able to constantly, or at select intervals, update the recommender data structure based on a change of the rules from one or more service providers. For example, the recommender may query service provider databases based at select intervals, randomly, or when directed by a user. The recommender 110 may also use the recommender data structure to provide user recommendations for insurance carriers. In some examples, the recommender 110 may direct a user to various inquiries and based on the user's inputs to the various inquiries, analyzes the available options to select recommendations to the user.

The recommendation system 100 may further include one or more user devices 106. The user device 106 may communicate with the recommender 110 to receive one or more inquiries, provide answers to the inquiries to the recommender 110, and receive a recommendation from the recommender 110. In some examples, the user device 106 may display the result of the recommendation.

The recommendation system 100 may also include an administration device 108, that executes administrative procedures for the recommender 110. For example, the administration device 108 may allow an administrator user to modify one or more rules or the inquiry data associated with the recommender 110. The administration device 108 may also allow the user to trigger an automated update for the data structure by polling the one or more rules from the service provider device(s) 104 and causing the recommender 110 to update the inquiry data or the recommender data structure based on the updated rules from the service providers.

The service provider device 104, the user device 106 and the administration device 108 may communicate with each other and/or with the recommender 110 via a communication network 102. The communication network 102 may be any suitable type or a combination of types of communication system for transmitting data either through wired or wireless mechanism (e.g., WiFi, Ethernet, Bluetooth, cellular data, or the like). In some examples, certain components, e.g., service provide device 104 or user device 106, in the cloud system 100 may communicate via a first mode (e.g., Bluetooth) and others may communicate via a second mode (e.g., WiFi). Additionally, certain components may have multiple transmission mechanisms and be configured to communicate data in two or more manners. The configuration of the communication network 102 and communication mechanisms for each of the components may be varied as desired and based on the needs of a particular configuration or the like.

FIG. 2A is an example list of inquiries for a recommendation system according to various aspects of the present disclosure. In some example, a recommender (e.g., 110 in FIG. 1) may receive multiple rules from one or more service providers and convert the rules to inquiry data. For example, in FIG. 2A, the inquiry data 200 may include multiple inquiry entries or request characteristics, such as 210, 214, 220, 224 etc., where the inquiry entries may correspond to various rules or options for the service provider or may otherwise be configured to receive user information that can help to reduce or filter possible service plans or options to a user. An inquiry entry may include an inquiry 202 associated with one or more options 204 and one or more user actions 206 that correspond to the value of options 204. For example, an inquiry entry 210 may include an inquiry 211 for the user: "Do you have employees?" An inquiry may be associated with one or more options, which indicates possible answers to the inquiry. For example, for inquiry 211, the option value "No" in 212 indicates a possible answer to inquiry 210. For an option, if the user's answer to the associated inquiry equals the option value, the one or more corresponding actions may provide the possible recommendations for that option. For example, if the user's answer to inquiry 211 equals the value in the option 212, e.g., the user does not have employees, the corresponding actions 213 may include one or more actions. In this case, the possible actions include all possible actions from various service providers. In some examples, the recommender (e.g., 110 in FIG. 1) agglomerates all of the rules from multiple service providers to form the inquiry data, such as 200, such that different actions from different service providers that correspond to the same inquiry and option may be merged. For example, when a user does not have employees, different service providers may suggest different actions. In the example in 213, service provider CNA may suggest a "Hard Decline," while service provider BIS may require the user to provide "Manual Submission" or otherwise may provide an output to the user that a particular coverage is not available in the selected marketplace.

With further reference to FIG. 2A, in the case where there are multiple actions corresponding to an option value, the inquiry data may include additional inquiry entries to lead the user to reach a final recommendation. For example, in inquiry entry 220, an option value of "No" in 222 will lead to an additional inquiry entry 224, which asks "What are your gross annual sales?"

In some examples, an inquiry entry may be associated with multiple options. In the previous example, an inquiry in the inquiry entry 214 may include "Yes" and "No" option values. Alternatively, an inquiry may be associated with three or more option values. For example, the inquiry in inquiry 224 may include multiple option values: "$150,000 or less" in 226; "151,000-$1,500,000" in 232; and "Over $1,500,000" in 238. For an option value, the inquiry data 200 may include one or more inquiry entries. For example, if the user's answer to the inquiry 224 is "$150,000 or less," then the inquiry data includes additional inquiry entries 228. If the user's answer to the inquiry 224 is "151,000-$1,500,000," then the inquiry data includes additional inquiry entries 234. Similarly, if the user's answer to the inquiry 224 is "over $1,500,000," then the inquiry data includes additional inquiry entries 240. In other words, the inquiry entries may be linked to additional inquiry entries, this may be useful in instances where a recommended option may require user input on multiple characteristics and refinement of base characteristics, and the inquiry entries may be selected to help refine the possibilities.

In some examples, an option value may lead to one or more recommendation actions based on the user action(s) associated with an inquiry entry. For example, in an insurance recommendation system, the recommender actions may include: recommending a carrier, recommending manual submission, declining coverage, and/or other insurance related recommendation. In other systems, the recommender actions will include actions that may lead to recommendations to users in that specific system. For example, in an insurance recommendation system, with further reference to FIG. 2, in inquiry entry 214, which includes an inquiry "Are you based in or will you operate in the state of NY," an option value of "Yes" in 216 will lead to a user action that leads to a single recommendation action: "Hard Decline" in 218, meaning that no service provider offers coverage in the state of NY (New York). The option value and its response will depend on the type of options being analyzed by the recommender. In a non-limiting example, in inquiry 242, if the option value is "Yes," then the recommendation will include a single user action "Manual Submission" at 246, which recommends the user to manually submit an application to one or more service providers. Alternatively, the system may output a "no option available" or similar user message indicating that the user's particular situation may not be able to be covered in the particular marketplace. Similarly, if the option value is "No" for inquiry 244, then the user action will include a single carrier (e.g., BTIS) at 248, at which time a recommendation of service provider is found.

Figure 3A:
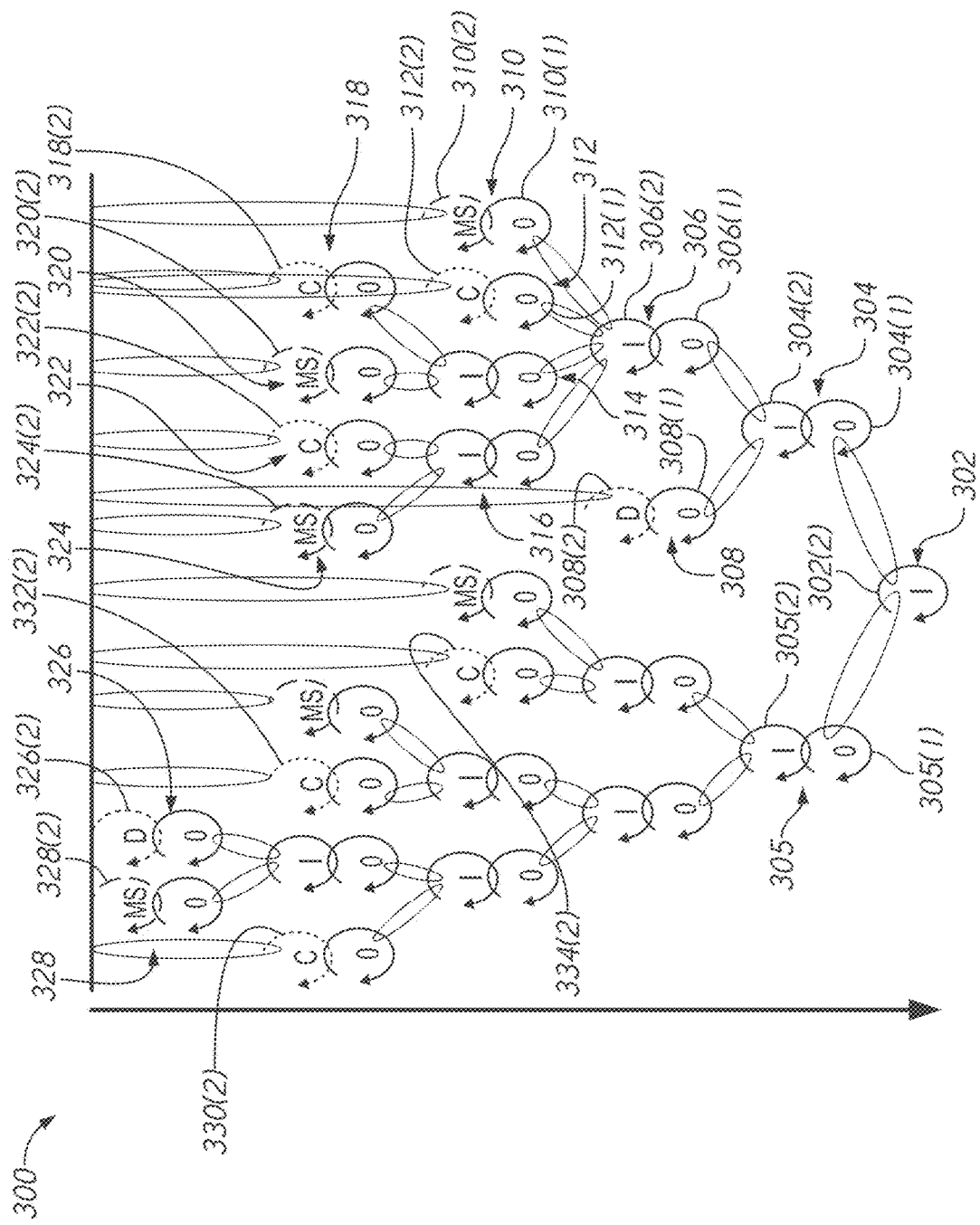
FIGS. 3A and 3B illustrate examples of a data structure for generating recommendations according to various aspects of the present disclosure.

FIG. 3A illustrates an example of a recommender data structure for generating recommendations according to various aspects of the present disclosure. In some examples, the recommender, e.g., 110 in FIG. 1, generates a recommender data structure 300 that can be used to generate recommendations. As shown in FIG. 3A, the recommender data structure 300 may be generated from the inquiry data, e.g., 200 in FIG. 2A.

As shown in FIG. 3A, the recommendation data structure 300 may include multiple nodes, e.g., 302-328, each node connecting to one or more other nodes in the structure. The recommendation data structure may be traversed from one node to another, such as via the inquiry hooks and option hooks described above. In such case, a node may represent a particular instance of data traverse in a recommender, at which a recommender may either provide a recommendation result or an additional inquiry to be asked to the user. For example, a node may include an inquiry hook, which represents a directional relationship connector to a next node to traverse in the recommendation data structure. For example, the inquiry hook may represent a recommendation action when the recommender data structure is traversed at the instant node. The recommendation action may include a recommendation result, in which case the inquiry hook may be an end point hook. The recommendation action may also include an inquiry that may lead the data structure to traverse to a next node, in which case the inquiry hook may include an inquiry text that includes an inquiry to be asked to the user.

A node may include an option hook associated with the inquiry hook. The option hook may represent a directional relationship connector to a previous node from which the recommendation data structure may be traversed. For example, the option hook may represent an option value associated with an inquiry of a parent node from which the data structure is traversed. In other words, the inquiry hook of a parent node may include inquiry text, e.g., a question to be asked to the user. In such case, the option nook of the child node may include one of the answers to the inquiry text of the parent node. If a user's answer to the inquiry text matches the option value represented by the option hook of the child node, then the data structure is traversed from the parent node to the child node. Once the data structure is traversed to the child node, the system may retrieve the associated inquiry hook of the child node and retrieve the recommendation action.

With further reference to FIG. 3A, in a non-limiting example, node 304 may include an option hook 304(1) and an inquiry hook 304(2). Node 304 may further be associated with child nodes 306 and 308. Similarly, node 306 also includes an option hook (e.g., 306(1)) and an inquiry hook (e.g., 306(2)). When node 304 is associated with node 306, the inquiry hook of node 304, e.g., 304(2) includes a reference to the option hook of node 306, e.g., 306(1). In each of the nodes 304, 306, each option hook is directly connected to an inquiry hook in that node. For example, in node 304, option hook 304(1) directly connects to the inquiry hook 304(2). An inquiry hook may contain a user inquiry text, for example, the inquiry hook 304(2) may include an inquiry text: "Are you based in or will you operate in the state of NY?" (see inquiry entry 214 in FIG. 2A). An inquiry hook may include a user inquiry that takes a number of option values. For example, the inquiry hook 304(2) may take two option values: "Yes" and "No," which are respectively represented by option hook 306(1) and 308(1) of the child nodes 306 and 308. In other words, an option hook in a child node may contain a value that represents one of the possible answers to the inquiry in the parent node with which the option hook is associated. For example, the inquiry 304(2) in parent node 304 may be associated with two child nodes 306 and 308, of which the option hook includes an option value that corresponds to the inquiry hook of the parent node. In the instant example, the inquiry hook 304(2) corresponds to two option values: an option value "Yes," which is included in option hook 308(1), and an option value "No," which is included in option hook 306(1).

In some examples, an option hook and an inquiry hook in a node may be directly connected, such that the option value in the option hook will invoke another inquiry represented by the inquiry hook in the same node. In the previous example, an option value in the option hook 306(1), which represents "No" to the inquiry 304(2), invokes the inquiry 306(2). In this example, to the inquiry 304(2), which asks whether the user is residing in the state of NY (see 214 in FIG. 2), if the user's answer is "No" (see option 222 in FIG. 2A), which is represented by option hook 306(1), then inquiry 306(2) is invoked, which asks the question "What are your gross annual sales?" (see inquiry 224 in FIG. 2A).

In some examples, a node may include only an inquiry hook and has no option hook. For example, a starting node 302 may include only the inquiry, such as "Do you have employees?" (see inquiry 211 in FIG. 2A). Inquiry 302 may be associated with possible option hooks 304(1) ("No") and 304(2) ("Yes"). In some examples, an inquiry hook may be an end point hook, such as 308(2). An end point hook may include a recommended action connected to the option hook or otherwise point to a particular output to a user. A recommended action may include: manual submission (MS), such as 310(2), which suggests that user submit an application manually to the service provider. A recommended action may also include a carrier (C), such as 312(2), which suggests a carrier that may provide the coverage based on the user's profile (through answering various inquiries in the recommender data structure described herein). A recommended action may also include denial (D), such as 308(2), which suggests that the user's request for a recommended service provider is denied, indicating that no service provider is able to provide a suitable coverage based on the user's profile.

Now, with further reference to FIGS. 2A and 3A, a complete recommender data structure 300 may be built based on the inquiry data 200. As a starting point in the data structure 300, a start node 302 (with no option hooks) may include a sole inquiry hook 302(2) that includes the inquiry 210. The start node 302 may be associated with two option hooks 304(1) and 305(1) of two respective nodes 304 and 305, where the two option hooks each corresponds to one of the possible answers to the parent inquiry 302. For example, option hook 304(1) corresponds to an option value "No" 212 to the inquiry 211, which asks whether the user has employees. An option value "No" in 304(1) will invoke inquiry hook 304(2) connected thereto in node 304. In some examples, the inquiry hook 304(2) may include inquiry text 214. Inquiry hook 304(2) is associated with two option hooks 306(1) and 308(1) of two respective nodes 306 and 308, where the two option hooks each corresponds to one of the possible answers to its parent inquiry 304(2). In this case, 304(2) includes the inquiry text 214, which asks if the user resides in the state of NY. An option value of "Yes" at 216 is represented by the option hook 308(1), which directly connects to an end point hook 308(2), representing a recommendation of "Hard decline." An option value of "No" at 226 is represented by the option hook 306(1), which connects to an additional inquiry 306(2), which corresponds to the inquiry text 224.

By parsing all of the inquiry entries in the entire inquiry data, the recommender will complete the recommender data structure 300 by building the inquiry pathways down from the endpoints, with the multiple end point hooks on the top, such as, denial (e.g., 308(2), 326(2)), manual submission (e.g., 310(2), 320(2), 324(2), 328(2)), or a recommended service provider (e.g., 312(2), 318(2), 322(2)). In this manner, the recommender data structure 300 may be considered a top-down structure as compared to a conventional bottom-up structure where the pathways are built up from the initial inquiries to the endpoints at the top, as explained more fully below. The recommender data structure 300 allows fast updating due to a change to the rules by the service providers, in that nodes in the data structure can be dynamically added or deleted according to the change of rules. This is further illustrated with reference to FIGS. 2B and 3B.

FIG. 2B is an example list of inquiries for a recommendation system according to various aspects of the present disclosure. The service providers may change the rules from time to time or otherwise vary the possible options based on the inquiry answers. For example, a service provider may change the requirement of certain coverages; a service provider may add a new coverage in a new market; or the like. For example, one or more service providers decided to cover the NY market. The recommender (e.g., 110 in FIG. 1) may implement the changes of the rules by updating the inquiry data (e.g., 200 in FIG. 2A) to reflect the changes. Now, the inquiry data 200 in FIG. 2A is reproduced in FIG. 2B, with the inquiry entries 214 and 220 removed. The users will be no longer asked whether they are based or will operate specifically in NY because NY is now covered. Based on the deletion of inquiry entries 214 and 220 in the inquiry table 200, the recommender system may update the recommender data structure, as illustrated in FIG. 3B.

Figure 3B:
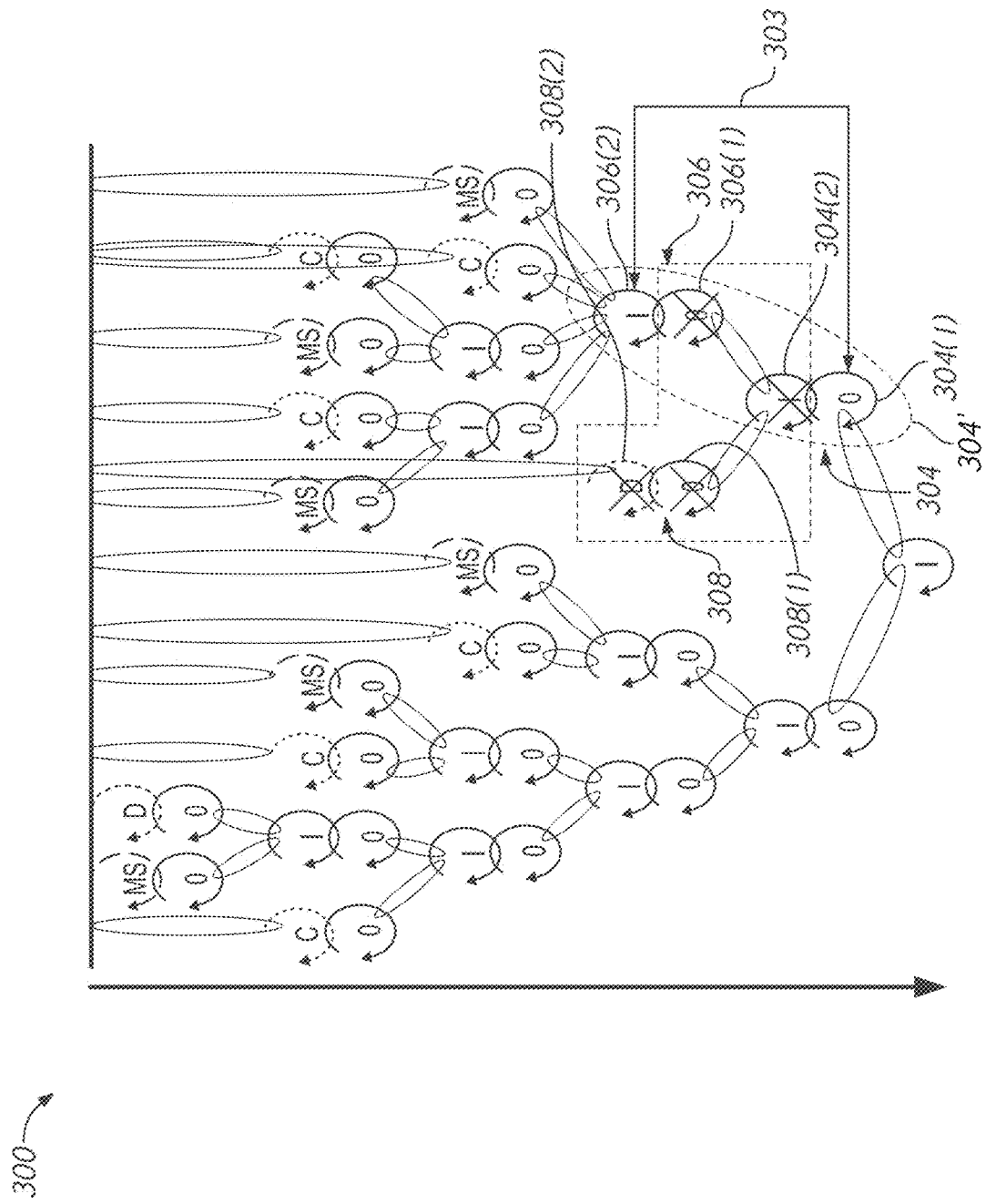

In FIG. 3B, the recommender data structure 300 is reproduced with certain nodes varied in position or removed based on corresponding changes of the inquiry data (e.g., 200 in FIG. 2B). That is, the database structure dynamically updates based on changes to the inquiry data to change node relationships, node states, or node presence. For example, the inquiry hook 304(2) that corresponds to inquiry entries 214 and 220 is deleted, so is the option hooks associated with the inquiry hook 304(2). In this case, option hooks 308(1) and 306(1) associated with the inquiry hook 304(2) are removed as well. In some examples, if an option hook to be removed directly connects to an inquiry hook, the option hook of the parent node immediately preceding the deleted option hook will be associated with that inquiry hook. For example, the deletion of the option hook 306(1) will cause the option hook 304(1) in the parent node 304 to connect to the inquiry 306(2) (see 303) previously connected to the deleted option hook 306(1). If an option hook directly connects to an end point hook, that end point hook will also be deleted as the result of the deletion of the option hook. For example, the deletion of the option hook 308(1) will cause the end point hook 308(2) to also be deleted.

In some examples, if both the inquiry hook and the option hook of a node are removed, then the entire node is removed. For example, node 308 is removed because the option hook 308(1) and the end point 308(2) are both deleted. In some examples, two nodes may be merged. For example, node 304 and node 306 are merged into one node, which combines the inquiry hook 306(2) and the option hook 304(1).

Figure 4:
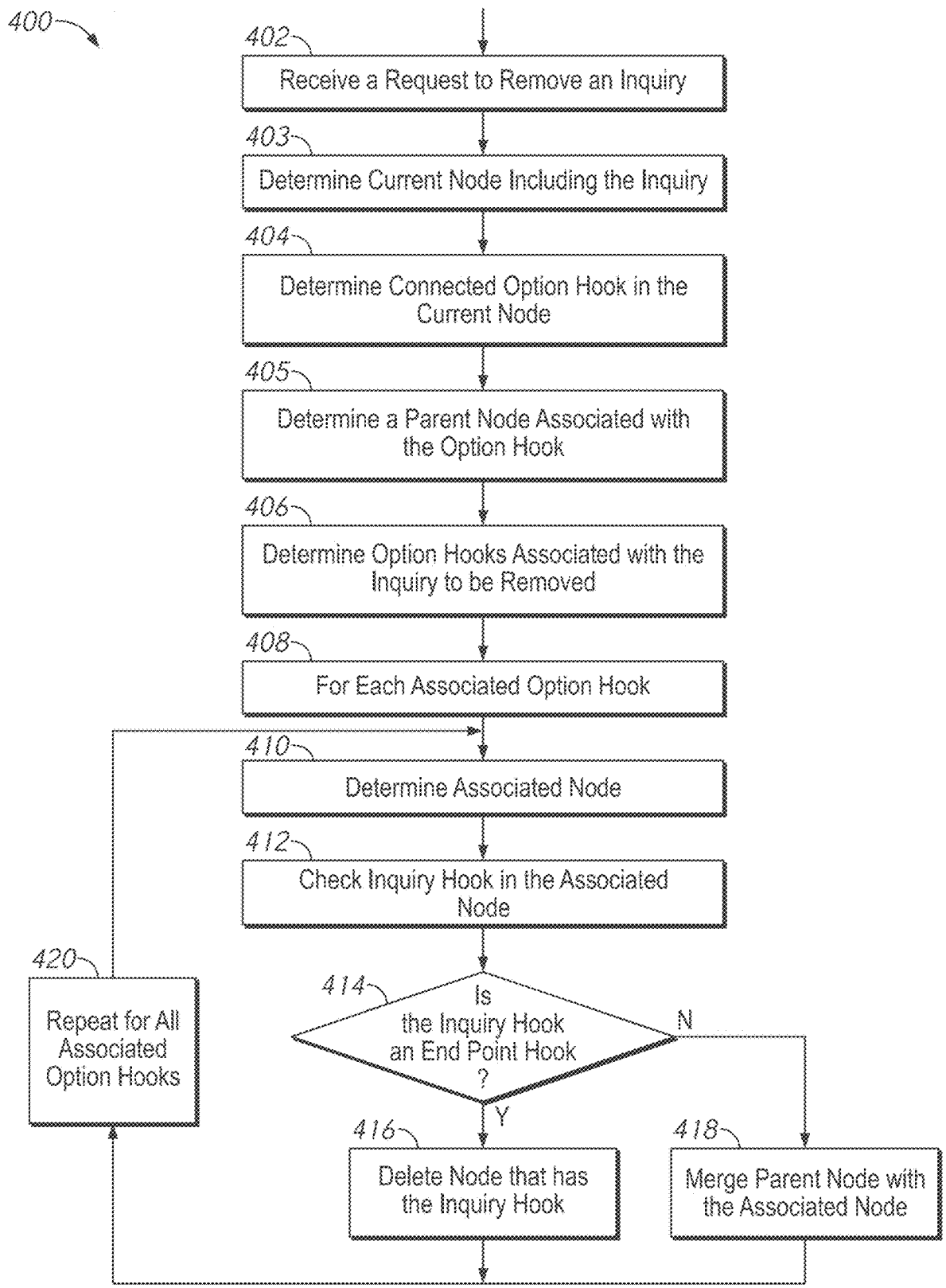
FIG. 4 illustrates an example of a process of updating the recommender data structure according to various aspects of the present disclosure.

FIG. 4 illustrates an example of a process of removing an inquiry from the recommender data structure. In some examples, a process 400 may include receiving a request to remove an inquiry at 402. Upon receiving the request to remove the inquiry, the process may determine the current node that includes the inquiry at 403. The process may further determine the option hook in the current node that is connected to the inquiry to be removed at 404. The process may also determine a parent node that is associated with the option hook at 405. In some examples, a request to remove an inquiry may include information that identifies the inquiry entry, such as an inquiry number. In some examples, each of the inquiries and options in the recommender data structure (such as 300 in FIG. 3A) is associated with a unique number that identifies them. In such case, the process 400 may determine the parent node associated with the inquiry to be removed by the inquiry number. For example, in FIG. 3B, given the inquiry 214, 220 (in FIG. 2A), the process may determine the inquiry 304(2) and the corresponding parent node 304.

With further reference to FIG. 4, the process 400 may determine option hooks associated with the inquiry hook in the parent node at 406. For example, after determining the parent node 304, the process may determine the option hooks 306(1) and 308(1) that are associated with the inquiry hook 304(2) of the parent node 304. The process may iteratively process all of the determined option hooks at 408. For each determined option hook within the iteration, the process may include determining an associated node that has the option hooks, at 410. For example, after determining the option hooks 306(1) and 308(1), the process determines the associated nodes 306 and 308, in which the option hooks 306(1) and 308(1) are, respectively. The process further checks the inquiry hook in the associated node at 412. For example, the process may further check inquiry hook 306(2) and inquiry 308(2) in nodes 306 and 308, respectively. When checking the inquiry hook, the process may determine whether an inquiry hook is an end point hook at 414. For example, an end point hook may include a recommended action connected to the option hook, such as manual submission (MS), a carrier (C), or a denial (D). If an inquiry hook is not an end point hook, it may be associated with one or more option hooks. For example, the inquiry hook 306(2) is not an end point hook, and it is associated with one or more options. Inquiry hook 308(2), on the other hand, is an end point hook that represents a recommended action of a denial.

With further reference to FIG. 4, if it is determined that the inquiry hook is an end point, the process may delete the node that has the end point inquiry hook at 416. In the instant example, the process may remove node 308 because the inquiry hook 308(2) is an end point hook. In some examples, if it is determined that the inquiry hook is not an end point hook, the process may merge the parent node to the associated node at 418. For example, the inquiry hook 306(2) is not an end point hook, and the process may merge the parent node 304 to the current node 306. In merging the two nodes, the process may delete the inquiry hook of the parent node and the option hook in the associated node that the parent node points to, and change the option hook of the parent node to directly connect to the inquiry hook of the associated node. Consequently, the inquiry hook 304(2) and the option hook 306(1) are removed, and the option hook 304(1) and the inquiry hook 306(2) are directly connected in the newly formed node 304'. The process 400 may repeat blocks 410, 412, 414, 416 and 418 repeatedly for all of the associated option hooks at 420.

As shown in various steps in FIG. 4, with reference to FIGS. 3A and 3B, the inquiries can be deleted in the database structure dynamically without restructuring the entire data structure because only nodes that connect to the node corresponding to the inquiry are affected. In some examples, when new inquiries are added, new nodes can be added without affecting the entire database structure. It is further appreciated that in the recommender data structure, options associated with an inquiry can also be deleted or added as this involves updating the nodes that include corresponding option hooks associated with a given inquiry, without affecting other nodes in the database structure. This data structure may be traversed top down in some implementations and can be built in a top-down implementation. In these implementations, the top-down structure means that lower level nodes (e.g., those that ultimately lead to a particular end hook or end node), may be substituted in/out, as well as replaced or deleted without requiring an entirely new path to be constructed or generated. This is as compared to conventional bottom-up built databases where to change any low level entry or node requires an entire reconfiguration and reprogramming of the entire pathway and structure. Thus, making it difficult for users without programming experience to easily update or otherwise vary the database.

Figure 5:
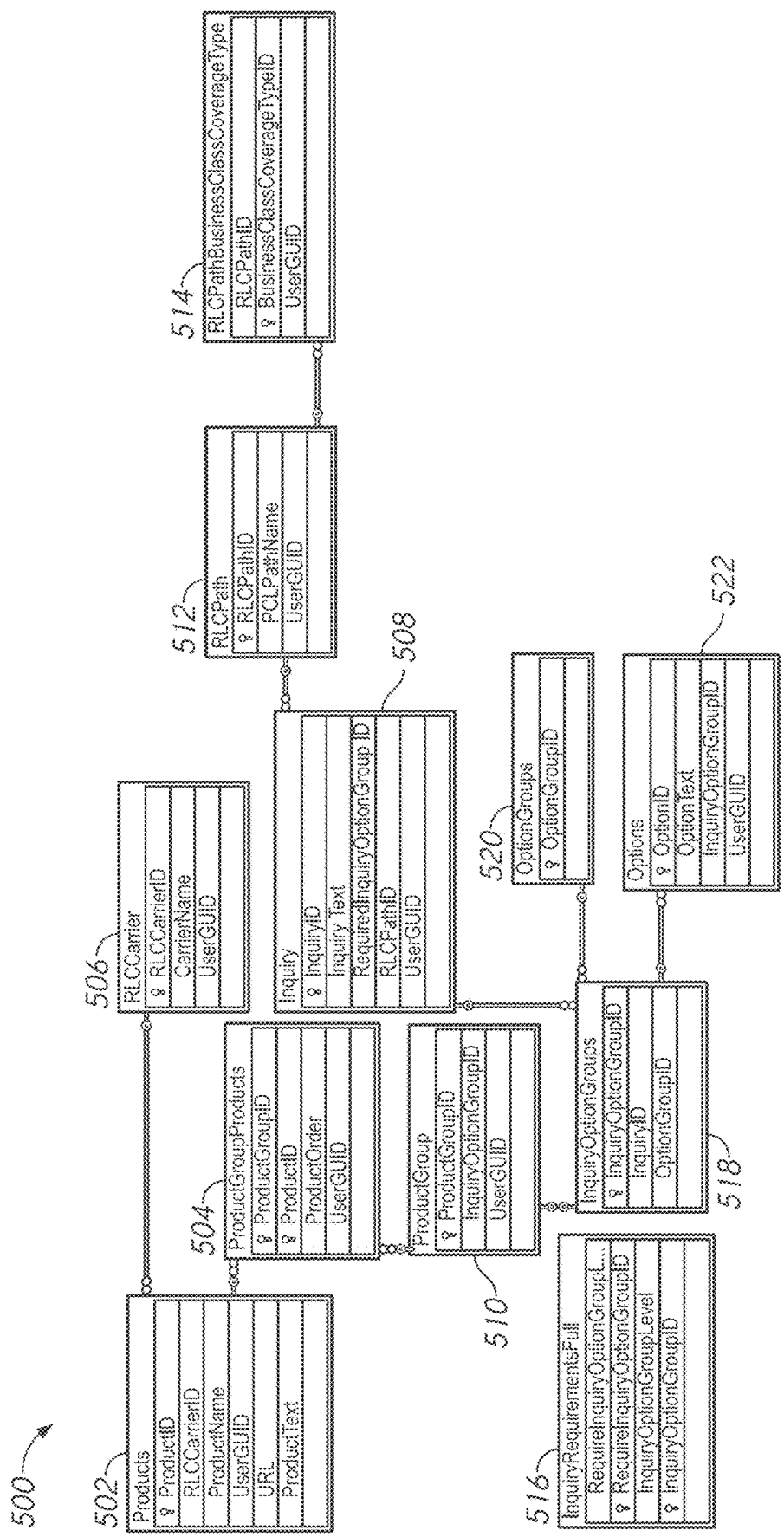
FIG. 5 illustrates an example of an implementation of the recommendation system in a relational database according to various aspects of the present disclosure.

FIG. 5 illustrates an example of an implementation of a recommendation system in a relational database according to various aspects of the present disclosure. In some examples, a relational database structure, such as a collection of tables 500 in an SQL database, may be built based on the recommender data structure shown in FIG. 3A. In some examples, each of the inquiries and options may be assigned a unique identification number (ID). For example, an inquiry may include an InquiryID and associated Inquiry Text, an option may include an OptionID and associated Option Text. A particular carrier in an end point may include a ProductID.

In some examples, relational database tables 500 may be built based on the recommender data structure, such as 300 in FIG. 3A, in an order from an end point of a node to a start node in the data structure. For example, an end point that includes a recommendation of a carrier, such as 334(2), 330(2), 332(2), 322(2), 318(2), and 312(2), may be converted to a product table, such as 502. The end points in the recommender data structure may be traversed down to build relational inquiry tables 508 and option table 522. In some examples, multiple carrier products may be grouped to build a product group, such as ProductsGroupProducts table 504. Similarly, options and inquiries may also be respectively grouped to form option groups, such as 520, and inquiry groups, such as 518. Once the relational tables 500 are built, the recommendation system may be implemented in a relational database that allows a user to query any of the database entries with a user interface. In some examples, data integrity of the recommender data structure may be maintained when implemented in a relational database. For example, data triggers and referencing checks may be utilized to ensure the data integrity when any of the rules for the recommendation system are changed.

Returning to FIG. 1, the recommender data structure may be stored in the database 112. The relational database, such as shown in FIG. 5, may also be stored in database 112. The user device 106 may have a user interface that allows a user to interact with the recommender system 110. For example, a user may request the recommender 110, via the communication network 102, to recommend an insurance carrier. In some examples, the recommender 110 may retrieve the relational database, formulate a SQL command, and query the relational database 112 with the SQL command. In some scenarios, the relational database responds to the SQL command by returning an inquiry. The recommender 110 transmits the inquiry, via the communication network 102, to the user device 106 associated with the user. Upon receiving the inquiry, the user device 106 may display the inquiry in the user interface of the user device.

In some examples, the user interactions as captured on the user device 106 are transmitted to the recommender 110, then to the database 112, which traverses the database structure based on the user interactions. For example, in responding to an inquiry, depending on the user's answers, the database 112 may traverse to one of the option hooks associated with an inquiry hook. The database 112 may return the inquiry text of another inquiry that is connected to the selected option hook, or return with a recommendation of a carrier, if the connected inquiry hook is an end point hook. Alternatively, the database may return with manual submission or a denial.

Figure 6:
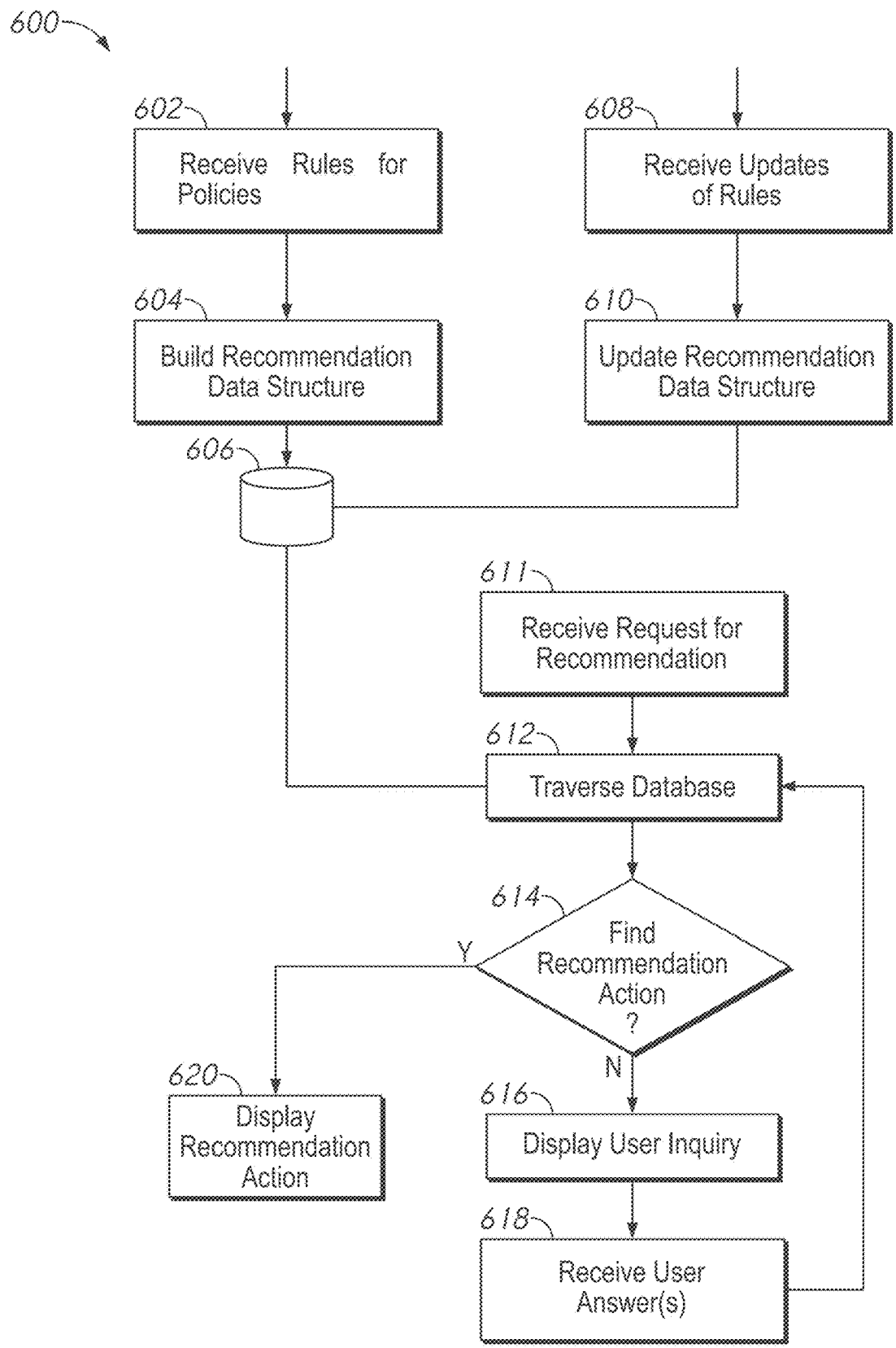
FIG. 6 illustrates an example of a process of recommending an insurance carrier according to various aspects of the present disclosure.

FIG. 6 illustrates an example of a process of recommending an insurance carrier according to various aspects of the present disclosure. In some examples, the process may be implemented in a recommender (110 in FIG. 1) in accordance with various systems and methods described in FIGS. 1-5. For example, a recommendation process 600 may include receiving rules for one or more policies at 602. For example, the rules may be determined by analyzing current trends in underwriting requirements, insurance carrier preferences, market knowledge or the like, and may be represented in inquiry data, such as shown in FIG. 2A. The process 600 may further include building a recommender data structure based on the rules at 604 to generate the recommendation data structure 606. Examples of recommendation data structure are shown in FIGS. 3A and 3B. In some examples, box 604 may be an automatic process in which the recommender (e.g., 110 in FIG. 1) parses the rules from the insurance carrier(s) and converts to the recommendation data structure. In other examples, box 604 may be implemented in a user interface that prompts an operator to enter the rules and the process converts the rules to the data structure. The process 600 may also facilitate updating the recommendation data structure dynamically based on the change of rules. For example, process 600 may include receiving updates of rules at 608 and update the recommender data structure at 610 based on the updated rules. For example, the updates of rules may be provided by the one or more insurance carriers, and include a deletion of an inquiry. As shown in FIG. 4, with reference to FIGS. 3A and 3B, a deletion of an inquiry result in an deletion of one or more nodes in the recommendation data structure.

With further reference to FIG. 6, the process 600 may further facilitate a customer request for recommending a carrier and make a recommendation. In some examples, the process 600 may include receiving a customer request for recommendation of an insurance carrier at 611, for example, via a user interface of the recommendation system. The process 600 may subsequently traverse the recommendation data structure at 612. For example, as illustrated in FIG. 3A, the traverse process may start from the start node 302, to node 304, to node 306, to node 316, and arrive at node 322. At each traverse, process 600 may determine whether a recommendation action is found at 614. For example, if the inquiry hook of a node includes an end point hook, such as hook 322(2) of node 322, then the process 600 may determine that a recommendation action is found, which is included in the end point hook 322. The process 600 then retrieves the recommendation action from the end point hook and displays the recommendation action at 620. In the instant example, the recommendation action in the end point hook 322(2) of node 322 may include a name of the recommended carrier. Subsequently, the process 600 makes one single recommendation and displays the name of the recommended carrier on the display. If the inquiry hook of a node includes an inquiry text, the process 600 may determine that no recommendation action is found at 614. The process 600 may retrieve the user inquiry from the inquiry hook of the node, for example, and subsequently display the user inquiry at 616. The process 600 may further prompt, via a user interface, a user for an answer to the inquiry at 616, receive the user's answer at 618 and continue traversing the recommendation data structure at 612. This process repeats until a node with an end point hook is found.

Figure 7:
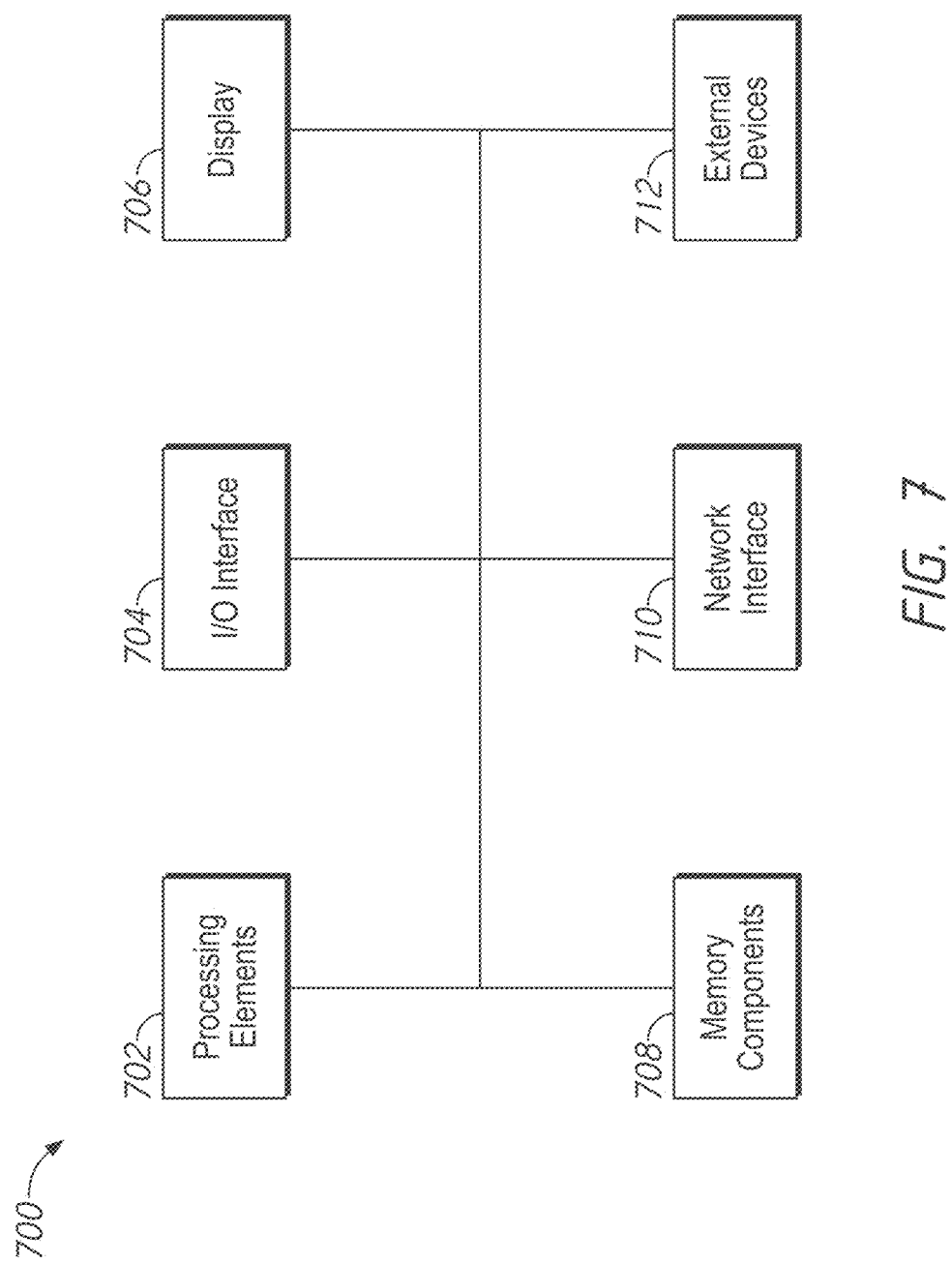
FIG. 7 is an example block diagram of a computing device that can be used to implement various systems and methods described herein.

FIG. 7 shows a simplified block structure for a computing device that may be used with the system 100 (in FIG. 1) or integrated into one or more components of the system. For example, the recommender 110, the admin device 108, the service provider device 104, and/or one or more user devices 106 may include one or more of the components shown in FIG. 7 and be used to implement one or more blocks or execute one or more of the components or operations disclosed in FIGS. 2-6. In FIG. 7, the computing device 700 may include one or more processing elements 702, an input/output interface 704, a display 706, one or more memory components 708, a network interface 710, and one or more external devices 712. Each of the various components may be in communication with one another through one or more busses, wireless means, or the like.

The processing element 702 may be any type of electronic device capable of processing, receiving, and/or transmitting instructions. For example, the processing element 702 may be a central processing unit, microprocessor, processor, or microcontroller. Additionally, it should be noted that some components of the computer 700 may be controlled by a first processor and other components may be controlled by a second processor, where the first and second processors may or may not be in communication with each other.

The memory components 708 are used by the computer 700 to store instructions for the processing element 702, as well as store data, such as the relational database or the recommender data structure (e.g., 112 in FIG. 1), and the like. The memory components 708 may be, for example, magneto-optical storage, read-only memory, random access memory, erasable programmable memory, flash memory, or a combination of one or more types of memory components.

The display 706 provides visual feedback to a user, such as inquiries or recommendation outcome provided by the recommender (e.g., 110 in FIG. 1). Optionally, the display 706 may act as an input element to enable a user to control, manipulate, and calibrate various components of the computing device 700. The display 706 may be a liquid crystal display, plasma display, organic light-emitting diode display, and/or cathode ray tube display. In embodiments where the display 706 is used as an input, the display may include one or more touch or input sensors, such as capacitive touch sensors, resistive grid, or the like.

The I/O interface 604 allows a user to enter data into the computer 700, as well as provides an input/output for the computer 700 to communicate with other devices or services (e.g., recommender 110 in FIG. 1). The I/O interface 704 can include one or more input buttons, touch pads, and so on.

The network interface 710 provides communication to and from the computer 700 to other devices. For example, the network interface 710 allows the device 106 to communicate with the recommender 110 through the network 102 (in FIG. 1). The network interface 710 includes one or more communication protocols, such as, but not limited to WiFi, Ethernet, Bluetooth, and so on. The network interface 710 may also include one or more hardwired components, such as a Universal Serial Bus (USB) cable, or the like. The configuration of the network interface 710 depends on the types of communication desired and may be modified to communicate via WiFi, Bluetooth, and so on.

The external devices 712 are one or more devices that can be used to provide various inputs to the computing device 700, e.g., mouse, microphone, keyboard, trackpad, or the like. The external devices 712 may be local or remote and may vary as desired.

The foregoing description has a broad application. For example, while examples disclosed herein may focus on central communication system, it should be appreciated that the concepts disclosed herein may equally apply to other systems, such as a distributed, central or decentralized system, or a cloud system. For example, recommender (e.g., 110 in FIG. 1) may be residing on a server in a client/server system. The recommender may also be residing on any device on the network and operate in a decentralized manner. The recommender may also be residing in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

Figure 8:
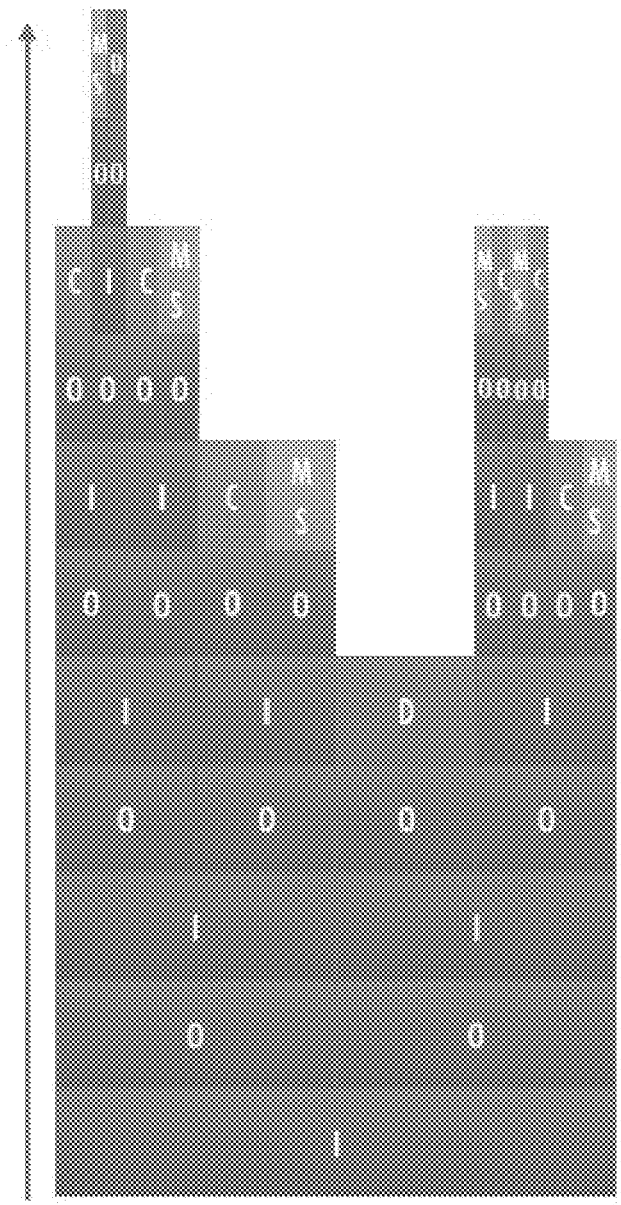
FIG. 8 is an example of a traditional database structure with a bottom-up structure.

Various embodiments described in FIGS. 1-7 provide advantages over existing solutions. For example, the recommender (110 in FIG. 1) runs efficiently by using a recommender data structure that can be easily updated with the change of rules without rebuilding the entire data structure. The recommender may also be implemented in a relational database and utilize the relational database's data triggers and referencing check to ensure the data integrity when any of the rules for the recommendation system are changed. For example, with a conventional bottom-up built database as shown in FIG. 8, where the inquiries and options are built as a "tower of blocks," one on top of the other, with the end results forming the last structures to be added, changes to an inquiry or even an end result, require that the entire structure be undone and rebuilt. On the contrary, the database structure provided herein is a top-down structure, which builds the pathways down from the endpoints, enabling changes to inquiries, including the addition of new inquiries or mid-stack inquiries, to be completed without disrupting the entire structure. For example, sections can be moved to a node or point in a different direction or momentarily unhooked (e.g., unconnected to two or more nodes), while new inquiries or items are added above. This saves considerable time in reformatting and rebuilding the database in light of changes to the nodes or the end results, which is very helpful in quick changing industries, such as insurance, where the rules applicable to a particular insurance carrier or policy may change frequently. In this manner, the recommendation system may be adaptable to provide for improved function of a computing system by providing for modification of recommendation trees or database structures, without rearranging every node of the database structure. For example, updates to the database structure may be accomplished at increased speed, increase efficiency, and/or with less computing power compared to conventional database structures.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary. In each of the figures, like numerals represent like items throughout the figures.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications and combinations may be made without deviating from the spirit and scope of the present disclosure. For example, although various embodiments are described in the application of insurance coverage, the systems and methods described herein may also be applied to other recommendation applications. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An adaptable recommendation system, providing for improved function of a computing system by providing for modification of recommendation trees, without rearranging every node of the recommendation trees, the adaptable recommendation system comprising:
   a hardware processor;
   an information storage; and
   a recommender configured to structure the information storage according to a recommender data structure, the recommender data structure including a set of rules provided by a third party, the data structure comprising:
   a plurality of nodes, each node comprising an inquiry hook and an option hook connected to each other, the inquiry hook including an inquiry text corresponding to a user inquiry, wherein
   a first node in the plurality of nodes is associated with one or more child nodes in the plurality of nodes, wherein the user inquiry text of the first node includes one or more option values, each option value is included respectively in the option hook of the one or more child nodes;
   the inquiry hook of at least one of the plurality of nodes includes an end point hook, which corresponds to one or more recommendation actions; and
   the recommender is further configured to restructure the information storage based on a change to the set of rules, by changing the option hook of the first node, but not the option hooks of all of the plurality of nodes, such that the recommender data structure is revised without being recreated, thereby improving a speed and an efficiency at which the computing system is modified.

2. The system of claim 1, wherein the plurality of nodes also includes a start node that includes a sole inquiry hook, the start node is associated with one or more nodes in the plurality of nodes, wherein a user inquiry text of the start node includes one or more option values, each option value is included respectively in the option hook of the one or more associated nodes.

3. The system of claim 1, wherein the recommender is configured to:
   generate the recommender data structure from inquiry data, the inquiry data comprising a plurality of inquiry entries, each inquiry entry comprising: a user inquiry, an option value, and one or more corresponding user actions, wherein the user actions include one or more of: recommending an insurance carrier, recommending manual submission, and declining coverage;
   receive one or more rules from a service provider device;
   use the one or more rules to update the inquiry data; and
   update the recommender data structure based on the updated inquiry data.

4. The system of claim 1, wherein:
   the information storage includes a relational database; and
   the recommender is further configured to generate the relational database based on the recommender data structure.

5. An adaptable recommendation system, providing for improved function of a computing system by providing for modification of recommendation trees, without rearranging every node of the recommendation trees, the adaptable recommendation system comprising:
   a hardware processor;
   an information storage; and
   a recommender configured to structure the information storage according to a recommender data structure, the data structure comprising:
   a plurality of nodes, each node comprising an inquiry hook and an option hook connected to each other, the inquiry hook including an inquiry text corresponding to a user inquiry, wherein:
   a first node in the plurality of nodes is associated with one or more child nodes in the plurality of nodes, wherein the user inquiry text of the first node includes one or more option values, each option value is included respectively in the option hook of the one or more child nodes; and
   the inquiry hook of at least one of the plurality of nodes includes an end point hook, which corresponds to one or more recommendation actions;
   wherein the recommender is configured to:
   receive a request from a user device to recommend a service provider;
   access the information storage to traverse the recommender data structure from a start node;
   retrieve a user inquiry text from an inquiry hook in the recommender data structure;
   transmit the user inquiry text to the user device for displaying on a user interface of the user device;
   receive an answer from the user device; and
   use the answer from the user device to continue traversing the recommender data structure.

6. The system of claim 5, wherein the recommender is configured to generate the recommender data structure from inquiry data, the inquiry data comprising a plurality of inquiry entries, each inquiry entry comprising: a user inquiry, an option value, and one or more corresponding user actions, wherein the user actions include one or more of: recommending an insurance carrier, recommending manual submission, and declining coverage.

7. The system of claim 6, wherein the recommender is configured to:
   receive one or more rules from a service provider device;
   use the one or more rules to update the inquiry data; and
   update the recommender data structure based on the updated inquiry data.

8. The system of claim 5, wherein the recommender is configured to:
   during traversing the recommender data structure, reach a node that includes the end point hook;
   retrieve a recommendation action from the end point hook; and
   transmit the recommendation action to the user device.

9. The system of claim 5, wherein the recommender is configured to:
   receive a request to remove a user inquiry;
   determine a current node in the recommender data structure that includes an inquiry hook corresponding to the user inquiry to be removed;
   determine a parent node associated with the option hook in the current node;
   determine one or more option hooks associated with the corresponding inquiry hook;
   for each of the one or more option hooks:
     determine an associated node that includes the option hook;
     determine whether the inquiry hook in the associated node includes the end point hook;
     if the associated node includes the end point hook, delete the associated node;

otherwise, merge the parent node with the associated node.

10. A computer-implemented method for improving function of a computing system by providing for modification of recommendation trees, without rearranging every node of the recommendation trees, the method comprising:
configuring, by a hardware processor, an information storage according to a recommender data structure, the recommender data structure including a set of rules provided by a third party, the data structure comprising:
a plurality of nodes, each node comprising an inquiry hook and an option hook connected to each other, the inquiry hook including an inquiry text corresponding to a user inquiry, wherein:
a first node in the plurality of nodes is associated with one or more child nodes in the plurality of nodes, wherein a user inquiry text of the first node has one or more option values, each option value is included respectively in the option hook of the one or more child nodes;
the inquiry hook of at least one of the plurality of nodes includes an end point hook, wherein the end point hook directs to a recommendation action; and restructuring the information storage based on a change to the set of rules, by changing the option hook of the first node, but not the option hooks of all of the plurality of nodes, such that the recommender data structure is revised without being recreated, thereby improving a speed and an efficiency at which the computing system is modified.

11. The method of claim 10, wherein:
the plurality of nodes also includes a start node that includes a sole inquiry hook, the start node is associated with one or more nodes in the plurality of nodes, wherein a user inquiry text of the start node has one or more option values, each option value is included respectively in the option hook of the one or more associated nodes; and
the method further comprises:
receiving a request from a user device to recommend a service provider;
accessing the information storage to traverse the recommender data structure from the start node;
retrieving a user inquiry text from an inquiry hook in the recommender data structure;
transmitting the user inquiry text to the user device for displaying on a user interface of the user device;
receiving an answer from the user device; and
using the answer from the user device to continue traversing the recommender data structure, wherein traversing the recommender data structure comprises reaching a node that includes the end point hook, retrieving a recommendation action from the end point hook, and transmitting the recommendation action to the user device.

12. The method of claim 10, further comprising generating the recommender data structure from inquiry data, the inquiry data comprising a plurality of inquiry entries, each inquiry entry comprising: a user inquiry, an option value, and one or more corresponding user actions, wherein the user action includes one of: recommending an insurance carrier, recommending manual submission, and declining coverage.

13. The method of claim 12, further comprising:
receiving one or more rules from a service provider device;
using the one or more rules to update the inquiry data; and
updating the recommender data structure based on the updated inquiry data.

14. The method of claim 10, further comprising:
receiving a request to remove a user inquiry;
determining a current node in the recommender data structure that includes an inquiry hook corresponding to the user inquiry to be removed;
determining a parent node associated with the option hook in the current node;
determining one or more option hooks associated with the corresponding inquiry hook;
for each of the one or more option hooks:
determining an associated node that includes the option hook;
determining whether the inquiry hook in the associated node includes the end point hook;
if the associated node includes the end point hook, deleting the associated node;
otherwise, merging the parent node with the associated node.

15. The method of claim 10, further comprising:
generating a relational database based on the recommender data structure; and
retrieving the one or more recommendation actions using the relational database.

16. A service provider device, providing for improved function of a computing system by providing for modification of recommendation trees, without rearranging every node of the recommendation trees, the service provider device comprising:
a hardware processor; and
non-transitory computer readable medium containing programming instructions that, when executed, cause the processor to transmit one or more rules to a recommender, to cause the recommender to use the one or more rules to structure an information storage according to a recommender data structure, the data structure comprising:
a plurality of nodes, each node comprising an inquiry hook and an option hook connected to each other, the inquiry hook including an inquiry text corresponding to a user inquiry, wherein:
a first node in the plurality of nodes is associated with one or more child nodes in the plurality of nodes, wherein a user inquiry text of the first node has one or more option values, each option value is included respectively in the option hook of the one or more child nodes; and
the inquiry hook of at least one of the plurality of nodes includes an end point hook, which corresponds to one or more recommendation actions;
wherein:
the recommender is configured to generate the recommender data structure from inquiry data, the inquiry data comprising a plurality of inquiry entries, each inquiry entry comprising: a user inquiry, an option value, and one or more corresponding user actions; and
the programming instructions further comprise programming instructions configured to cause the processor to transmit an update of one or more rules to the recommender to cause the recommender to use the update of the one or more rules to update the inquiry data, and update the recommender data structure based on the updated inquiry data;
wherein the recommendation actions include one or more of: recommending a carrier, recommending manual submission, and declining coverage and wherein the update of the one or more rules includes a request to remove a user inquiry, wherein the recommender is configured to:

determine a current node in the recommender data structure that includes the user inquiry to be removed;

determine a parent node associated with the option hook in the current node;

determine one or more option hooks associated with the inquiry to be removed;

for each of the one or more option hooks:

determine an associated node that includes the option hook;

determine whether the inquiry hook in the associated node includes the end point hook;

if the associated node includes the end point hook, delete the associated node; otherwise, merge the parent node with the associated node.

17. The device of claim 16, wherein the plurality of nodes also includes a start node that includes a sole inquiry hook, the start node is associated with one or more nodes in the plurality of nodes, wherein a user inquiry text of the start node has one or more option values, each option value is included respectively in the option hook of the one or more associated nodes.

18. An adaptable recommendation system, providing for improved function of a computing system by providing for modification of recommendation trees, without rearranging every node of the recommendation trees, the adaptable recommendation system comprising:

a hardware processor;
an information storage; and
a recommender configured to structure the information storage according to a recommender data structure, the data structure comprising:

a plurality of nodes, each node comprising an inquiry hook and an option hook connected to each other, the inquiry hook including an inquiry text corresponding to a user inquiry, wherein:

a first node in the plurality of nodes is associated with one or more child nodes in the plurality of nodes, wherein the user inquiry text of the first node includes one or more option values, each option value is included respectively in the option hook of the one or more child nodes; and the inquiry hook of at least one of the plurality of nodes includes an end point hook, which corresponds to one or more recommendation actions;

wherein the recommender is configured to: receive a request to remove a user inquiry;

determine a current node in the recommender data structure that includes an inquiry hook corresponding to the user inquiry to be removed;

determine a parent node associated with the option hook in the current node; determine one or more option hooks associated with the corresponding inquiry hook;

for each of the one or more option hooks: determine an associated node that includes the option hook; determine whether the inquiry hook in the associated node includes the end point hook;

if the associated node includes the end point hook, delete the associated node; otherwise, merge the parent node with the associated node.

* * * * *